April 14, 1959 J M. SUMMERS ET AL 2,881,499

STRESSED PANEL FASTENER

Filed May 5, 1955

INVENTOR.
J. MILLS SUMMERS
BY JACOB R. NEWCOMER, JR.

John P. Chandler
Their ATTORNEY.

United States Patent Office

2,881,499
Patented Apr. 14, 1959

2,881,499

STRESSED PANEL FASTENER

J Mills Summers, Englewood, and Jacob R. Newcomer, Jr., Westwood, N.J., assignors to Camloc Fastener Corporation, Paramus, N.J., a corporation of New York Application May 5, 1955, Serial No. 506,318

1 Claim. (Cl. 24—221)

This invention relates to a novel fastener which can be quickly fastened and unfastened with equal facility and relates more particularly to an improved fastener of the rotatable stud type which can be manipulated to fastened position by less than one full rotation of the stud. The present application is a continuation in part of our co-pending application Serial No. 386,268, filed October 15, 1953.

An important object of the invention is to provide an improved fastener for attaching panels to structures and for other purposes wherein the fastening elements are quickly moved to fully locked position without any relaxation of tension, as opposed to fasteners employing a helical ramp and detent, and wherein the parts, when locked, are positively secured against reverse rotation to unlocked position.

The improved fastener of the present invention has particular usefulness in connection with stressed panels for aircraft wherein it is a common practice to use screws or bolts extending through match-drilled holes to engage a threaded self-locking nut plate riveted to the rear surface of the structure. This common type of arrangement allows for pulling the sheets tightly together only after a comparatively large number of revolutions and depends largely upon friction built up in the plate nut for preventing unscrewing of the bolt due to vibration or other factors.

The shear stresses to which a stressed panel is subjected must be resisted by structural reinforcement around the opening and accordingly it becomes necessary to employ a comparatively large number of fasteners around the opening.

An important object of the present invention is to provide an improved fastener to replace the bolt and plate nut arrangement in structure and panel. In the instant fastener, however, the friction threaded engagement is always fully engaged and the parts having this threaded engagement are never removed from full frictional contact and engagement one with the other. Also it is not necessary to have any finding or proper mating of threads and the threads cannot become crossed nor short threaded.

Another object of the invention is to provide a fastener which under normal conditions requires less than one turn to fasten it or unfasten it and wherein its useful life is many times that of the self-locking nut type. Yet another object of the invention is to provide improved locking means to prevent the structure from becoming unfastened due to vibration and wherein the operator always knows when and if the fastener is in fully locked position.

A further object of the invention is to provide a novel fastener of the rotatable stud and receptacle type wherein there is provided resiliently loaded detent means for cooperating with the lower end of the stud, one of the members having a male portion and the other having a detent to receive the male portion under elastic load to resist rotation of the stud.

Yet another object of the invention is to provide improved thread locking means between the threaded parts to resist retrograde rotation due to vibration and other factors and this elastic load is constant and undiminished at all times.

Figure 1:
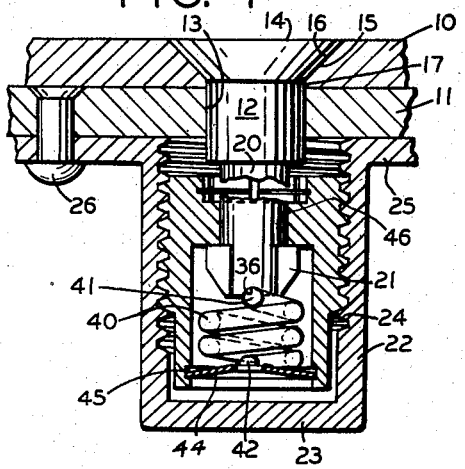
Fig. 1 is a central section taken through a fastener of the present invention securing two sheets together.

In the structure shown in Fig. 1 two superimposed sheets 10 and 11 are to be secured together by a fastener embodying the present invention, which includes a rotatable stud 12 which, when the parts are in fastened relation, is disposed within an opening 13 in sheet 11, the annular wall of the opening closely fitting the stud.

The stud has a flat head 14 whose frustro-conical lower surface 15 closely fits a flared opening 16 in the upper sheet aligned with opening 13. The shape of the head is, of course, a matter of choice and in the arrangement shown a portion of the main body of the stud is disposed within a non-flared portion 17 of the opening in the upper sheet. Thus the stud takes up shear loads between the sheets at the precise point at which they occur.

A round shank 20 extends below the main body portion 12 of the stud and the shank terminates in a cross pin element having opposed lugs 21.

The receptacle 22 includes a generally cylindrical body portion having a lower wall 23, internal threads 24 and laterally extending ears 25 for attachment, as by means of rivets 26, to lower sheet 11. In some instances it is desirable to rotate the receptacle portion instead of, or as well as, the stud. If a sealed receptacle is not required the lower wall 23 may be omitted.

Figure 2:
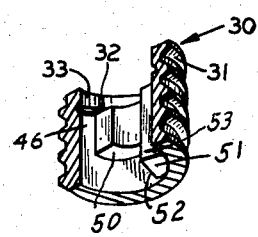
Fig. 2 is a broken perspective view of the upper section of the insert.
Figure 3:
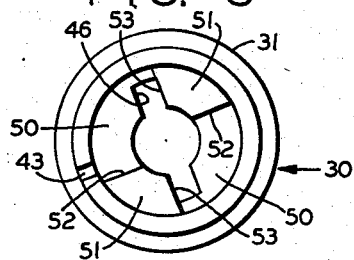
Fig. 3 is a bottom plan view of the insert.

An insert 30, shown in some detail in Fig. 2, and having external threads 31, is rotatably carried within the receptacle. As was earlier pointed out, it is necessary or at least desirable in most installations of the present fastener to provide some rotation-restraining means between the insert and the receptacle and in Fig. 4 this is shown as comprising a helical coil of wire or other material which is carried between the external threads of the insert and the threads of the receptacle. In Fig. 2, however, the rotation restraining means between the insert and the receptacle include a plurality of spaced slots or castellations 32 at the upper end of the insert, thus providing a plurality of segments 33 which are set outwardly from the male threads 31 of the insert and thus when the insert is screwed into the female threads 24 of the receptacle a desired measure of thread locking action will be achieved. The lower end of the shank is formed with a transverse slot 36. Coil spring 40 has an inwardly turned upper terminal 41 which engages the slot 36 immediately after the stud enters the receptacle and the stud has been rotated 90°.

The spring has an outwardly turned radial terminal 42 at its lower end and this terminal is received in a slot 43 at the lower unthreaded end of the insert, thus preventing relative rotation between the spring and the insert. The spring itself is supported by a lock washer arrangement 44 in conjunction with an internal annular groove 45 at the lower end of the insert. For the purpose of securing a greater surface contact between the spring and the washer, the lower end of the spring is ground somewhat flat.

The outer periphery of lugs 21 may have substantially the same diameter as the main body portion 12 of the stud. With this arrangement the rotation restraining force of radial detent terminal 41 of the spring against the opposed walls of recess 36 is constant at all times since the spring travels with the insert as it advances or retracts. The upper wall of the insert is provided with a central circular opening which receives the rotatable stud in relatively snug fit relation and forms a bearing therefor during rotation. The opening further has opposed radial extension 46 shaped to pass the cross pin element therethrough. The remaining lands in the upper wall form flat faces 50 and at one end of each face there is provided a downwardly extending abutment 51 having vertical faces 52 and 53, the two abutments lying diametrically opposed to each other. The lower end of the stud passes through opening 46 until lugs 21 underlie faces 50, at which time the stud can then be revolved clockwise about 90°, causing a bayonet type engagement between lugs 21 on the stud and faces 50 on the insert. Face 52 of each abutment forms a stop for each lug of the cross-pin element and continued rotation of the stud causes the insert to rotate and advance downwardly. This draws the sheets together and normally something less than one full term is necessary to lock the sheets tightly together. During insertion of the stud the end depresses and loads spring 40, causing spring terminal 41 to be forcibly engaged in detent 36 when the stud is revolved the initial 90° mentioned above. This forcible movement between spring 40 and the stud prevents disengagement of lugs 21 and faces 50 due to vibration, or any other cause.

It was earlier pointed out that the rotation of spring 40 relative to the insert is restrained.

When it is desired to unlock the fastener the stud is given the initial 90° turn, at which time the spring terminal has left slot 36 in the stud and when the cross-pin element becomes aligned with slot 46 the stud is freed. It is desirable, however, to move the insert upwardly in order to make the next locking easier and this is accomplished by simply rotating the stud an additional increment of rotation during which time the cross-pin elements are driving opposite faces 53 of abutments 50.

Figure 4:
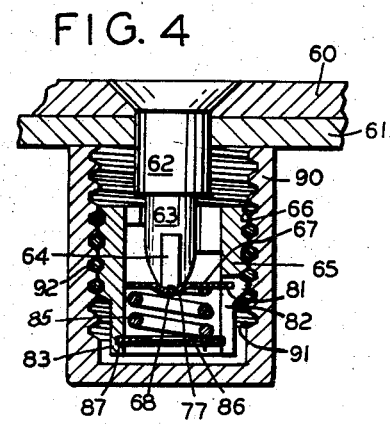
Fig. 4 is a section taken through the fastener and showing a modified rotation restraining means for the stud.
Figure 5:
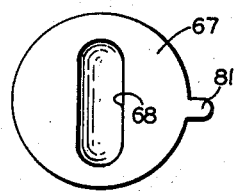
Fig. 5 is a plan view of the detent plate.

In the modified locking arrangement of Fig. 4 the sheets 60 and 61 are secured together by stud 62 having circular lower portion 63 and cross pin elements 64. The insert 65 has a threaded section 66 at its upper end. In this instance, however, a detent plate 67 having a transverse recess or detent 68 receives a male portion or transverse projection 77 formed at the lower end of the stud. The plate has a radial extension 81 which is received within a vertical slot 82 in the lower wall 83 of the insert to prevent rotation of the detent plate. The detent plate is supported and is urged upwardly by a spring 85 supported on a washer 86 received within an annular slot 87 at the lower end of the insert. The receptacle 90 is carried on the lower sheet and in this instance it is not secured thereto. It may be rotated by an externally applied tool and it has the internally threaded opening 91 to receive the insert. The rotation restraining means comprises a helical spring coil 92 carried initially by the insert.

Figure 6:
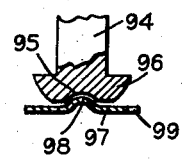
Fig. 6 is a section taken through a modified detent arrangement between stud and plate.

In the modified detent arrangement of Fig. 6 the stud 94 has a recess 95 at the lower end of cross-pin element 96 and the plate 97 has a raised rib 98 which enters the detent 95 at the lower end of the stud to secure the stud against rotation. A radial extension 99 is received within a slot similar to slot 82 (Fig. 4) in the insert to secure the plate against rotation. A spring similar to spring 85 urges the plate upwardly.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claim, and that all modifications that come within the meaning and range of equivalency of the claim are intended to be included therein.

What we claim is:

A quick-operating fastener for securing two structures together comprising a stud with an enlarged head and provided with radially extending lugs at its lower end forming a cross pin element, and a receptacle provided with an insert to receive the stud, threads between the receptacle and insert and rotation resisting means associated with the threads, the insert being provided with a horizontal wall having a circular central opening shaped to form a bearing for the stud, said opening having opposed radial extensions shaped to pass the lugs therethrough, an abutment extending downwardly adjacent one end only of each of the lower faces of said horizontal wall which lie on opposed sides of the radial opening, said abutments being disposed adjacent opposite ends of the opening, said lower faces having flat, uninterrupted surfaces lying on the same plane, said plane being normal to the axis of the insert, said surfaces being engaged by the upper faces of the lugs as the stud is rotated substantially one-quarter turn to a position where the lugs engage the abutments and cause the insert to advance as the stud is rotated further to produce conjoint rotation of the stud and insert, a spring mounted on the lower end of the insert and arranged to travel therewith as the insert is advanced and retracted, said spring reacting upwardly against the stud, a washer secured at the lower end of the insert on which the spring is supported, and means preventing rotation between the spring and the insert, the lower end of the stud having a transverse detent therein and the spring having an upper, radially extending terminal received in said stud detent to restrain rotation between spring and stud after the stud has been rotated to fastened position.

References Cited in the file of this patent

UNITED STATES PATENTS

| | | |
|---|---|---|
| 2,262,450 | Caminez | Nov. 11, 1941 |
| 2,323,260 | Venditty | June 29, 1943 |
| 2,350,498 | Dick | June 6, 1944 |
| 2,486,411 | Huelster | Nov. 1, 1949 |
| 2,571,641 | Wing | Oct. 16, 1951 |
| 2,691,199 | Schlueter | Oct. 12, 1954 |
| 2,757,429 | Summers | Aug. 7, 1956 |
| 2,817,135 | Harris et al. | Dec. 24, 1957 |

FOREIGN PATENTS

| | | |
|---|---|---|
| 372,696 | Italy | July 6, 1939 |
| 542,028 | Great Britain | Dec. 23, 1941 |
| 841,650 | France | Feb. 13, 1939 |